US008763644B2

United States Patent
Tsai et al.

(10) Patent No.: US 8,763,644 B2
(45) Date of Patent: Jul. 1, 2014

(54) FLOW STABILIZER

(71) Applicant: Delta Electronics, Inc., Taoyuan Hsien (TW)

(72) Inventors: Ming-Chih Tsai, Taoyuan Hsien (TW); Guan-Hsien Li, Taoyuan Hsien (TW); Yu-Lin Hsueh, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/629,631

(22) Filed: Sep. 28, 2012

(65) Prior Publication Data

US 2014/0014216 A1 Jan. 16, 2014

(30) Foreign Application Priority Data

Jul. 12, 2012 (TW) ............................... 101125023 A

(51) Int. Cl.
*F15D 1/02* (2006.01)

(52) U.S. Cl.
USPC .................................. 138/39; 138/43; 138/46

(58) Field of Classification Search
USPC .............................................. 138/39, 43, 46
See application file for complete search history.

(56) References Cited

U.S. PATENT DOCUMENTS

| | | | | | |
|---|---|---|---|---|---|
| 2,777,464 | A | * | 1/1957 | Mosely | 137/516.13 |
| 3,847,178 | A | * | 11/1974 | Keppel | 137/515.7 |
| 3,970,105 | A | * | 7/1976 | Pelton et al. | 137/498 |
| 4,000,857 | A | * | 1/1977 | Moen | 239/428.5 |
| 4,221,335 | A | * | 9/1980 | Shames et al. | 239/428.5 |
| 4,344,459 | A | * | 8/1982 | Nelson | 138/45 |
| 4,457,343 | A | * | 7/1984 | Zukausky | 138/45 |
| 4,562,960 | A | * | 1/1986 | Marty et al. | 239/72 |
| 6,311,712 | B1 | * | 11/2001 | Meyer | 137/8 |
| 2006/0096650 | A1 | * | 5/2006 | Sawchuk et al. | 138/39 |

FOREIGN PATENT DOCUMENTS

| | | |
|---|---|---|
| TW | 132225 | 4/1990 |
| TW | 343709 | 10/1998 |

* cited by examiner

*Primary Examiner* — James Hook
(74) *Attorney, Agent, or Firm* — CKC & Partners Co., Ltd.

(57) ABSTRACT

A flow stabilizer includes a base, a noise reduction structure, and a plurality of protrusion structures. The noise reduction structure is disposed on the base. The protrusion structures are disposed between the base and the noise reduction structure. The protrusion structures define a plurality of intervals, and at least two intervals are not equal.

15 Claims, 9 Drawing Sheets

FLOW STABILIZER

RELATED APPLICATIONS

This application claims priority to Taiwan Application Serial Number 101125023, filed Jul. 12, 2012, which is herein incorporated by reference.

BACKGROUND

1. Technical Field

Embodiments of the present disclosure relate to a flow stabilizer. More particularly, embodiments of the present disclosure relate to a flow stabilizer used for a water solenoid valve.

2. Description of Related Art

Water solenoid valves have been widely applied in various water supplying devices, such as a water faucet. In a general water solenoid valve, a valve rod is placed in a sliding channel of a base, to be able to slide along the sliding channel. A spring is contained in the sliding channel for applying a pushing force on the valve rod. A coil in the base can be electrically applied to generate magnetic forces contractedly or extendedly adjusting the position of the valve rod, so that the valve rod can be switched to close or open the flow channel of the water supplying device.

Generally, the water pressure of the water source like a tap water pipe may change with time. The change in water pressure usually affects the output flow rate of the water solenoid valve. Specifically, the increase in the water pressure of the water source also increases the output flow rate of the water solenoid. When the water pressure of the water source falls, the output flow rate of the water solenoid decreases. Therefore, such unstable output flow rate of the water solenoid valve introduces inconvenience for the users.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with one embodiment of the present disclosure, a flow stabilizer is provided for stabling the output flow rate of a water solenoid valve, and this flow stabilizer includes a base, a noise reduction structure and a plurality of protrusion structures. The noise reduction structure is disposed on the base. The protrusion structures are disposed between the base and the noise reduction structure, and define a plurality of intervals. At least two of the intervals are not equal.

In accordance with another embodiment of the present disclosure, a flow stabilizer is provided for stabling the output low rate of a water solenoid valve, and this flow stabilizer includes a base, a noise reduction structure and a plurality of protrusion structures. The noise reduction structure is disposed on the base. The protrusion structures are disposed between the base and the noise reduction structure. At least two of the protrusion structures have different shape or height.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
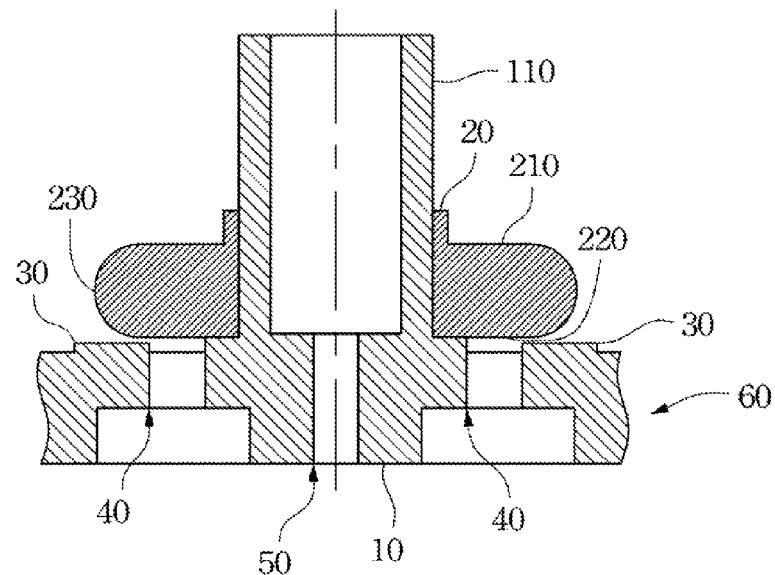
FIG. 1 is a cross-sectional view of a flow stabilizer in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will also be understood that, although the terms first, second, third, etc. may be used herein to describe various elements, these elements should not be limited by these terms. These terms are only used to distinguish one element from another. For example, a first protrusion structure could be termed a second protrusion structure, and, similarly, a second protrusion structure could be termed a first protrusion structure, without departing from the scope of the present disclosure.

FIG. 1 is a cross-sectional view of a flow stabilizer in accordance with one embodiment of the present disclosure. As shown in this figure, the flow stabilizer may include a flow guiding body 60 and a noise reduction structure 20. The flow guiding body 60 includes a base 10 and at least one protrusion structure 30. The protrusion structure 30 is protruded on one surface of the base 10. The number of protrusion structure 30 is a natural number not less than 1. The noise reduction structure 20 is placed on the base 10. The protrusion structure 30 is disposed between the base 10 and the noise reduction structure 20.

As shown in FIG. 1, at least one flow opening 40 is formed on the base 10. When fluid flows toward the flow stabilizer, the noise reduction structure 20 deforms because the fluid pressure changes, so that the flow rate of the fluid passing through the flow opening 40 can be limited as constant or in a certain range. The noise reduction structure 20 may include a first surface 210 and a second surface 220. The second surface 220 faces the protrusion structure 30. When the pressure of the fluid flowing toward the fluid stabilizer rises, the noise reduction structure 20 will be pressed by the fluid, and the second surface 220 will get closer to the flow opening 40, so that the passage that fluid can pass through will be reduced, and the flow rate will be controlled to not increase. When the pressure of the fluid flowing toward the flow stabilizer falls, the noise reduction structure 20 will bear lower pressure, and the second surface 220 will move far from the flow opening 40, so that the passage that fluid can pass through will be expanded, and the flow rate will be controlled to not decrease. Therefore the embodiment described above can effectively stable the flow rate, so that the flow rate of the fluid passing through the flow opening 40 can be limited as constant or in a certain range.

Figure 2:
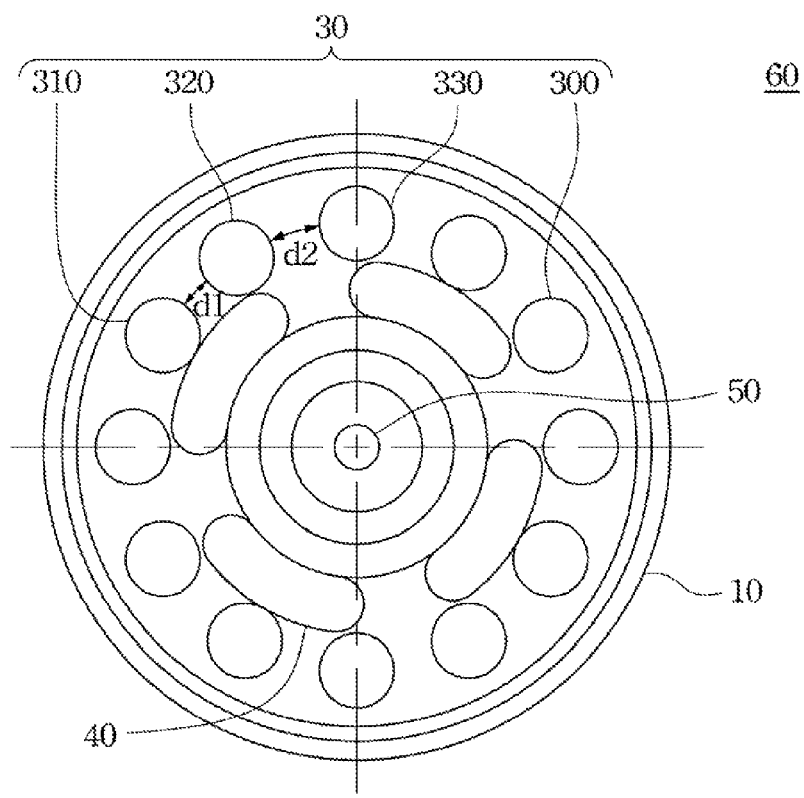
FIG. 2 is a top view of the flow guiding body shown in FIG. 1.

FIG. 2 is a top view of the flow guiding body 60 shown in FIG. 1. As shown in FIG. 2, when the number of the protrusion structure 30 is greater than 2, these protrusion structures 30 define a plurality of intervals, and at least two of the intervals are not equal. Specifically, the protrusion structure 30 in FIG. 2 may at least include a first protrusion structure 310, a second protrusion structure 320, a third protrusion structure 330 and other protrusion structure 300. The gap between the first protrusion structure 310 and the second protrusion structure 320 is defined as a first interval d1. The gap between the second protrusion structure 320 and the third protrusion structure 330 is defined as a second interval d2. The first interval d1 and the second interval d2 are not equal. The interval formed between the first protrusion structure 310 and the protrusion structure 300 adjacent to the first protrusion structure 310, the interval formed between the third protrusion structure 330 and the protrusion structure 300 adjacent to the third protrusion structure 330, and the interval formed between other protrusion structures 300 are equal in this embodiment, but they can be not equal based on demands.

In some embodiments, the interval, shape or height of the protrusion structure can be adjusted to modify the turbulent flow passing through the flow opening, so that the flow rate of the water solenoid valve can be further stabilized. Various protrusion structures are set forth in the following.

Figure 3:
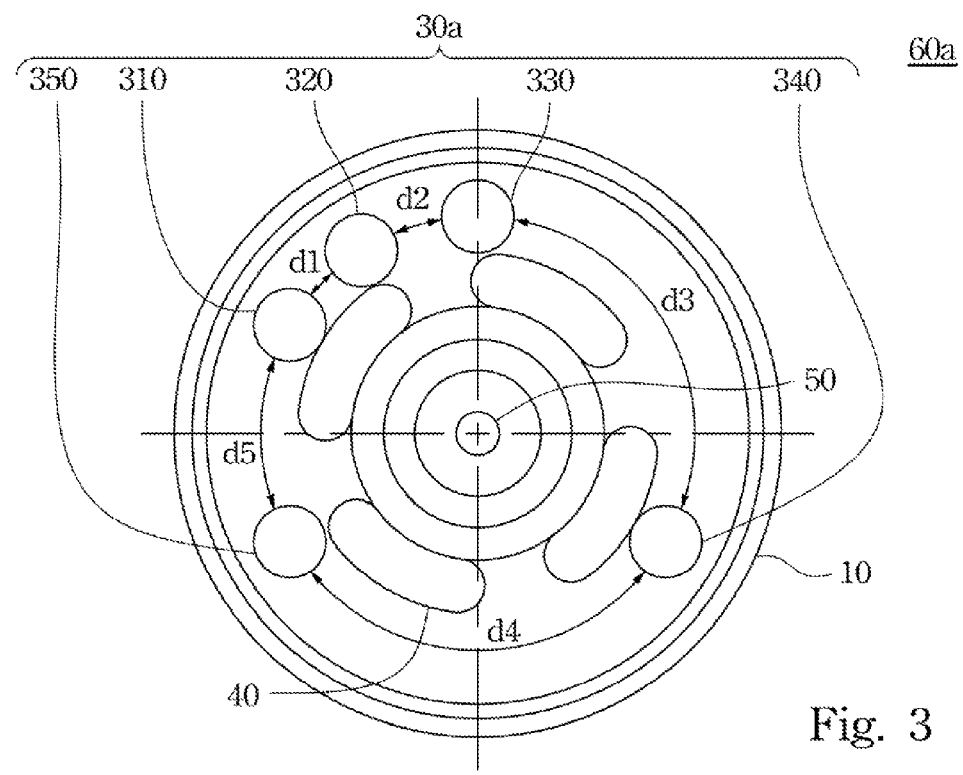
FIG. 3 is a top view of the flow guiding body in accordance with another embodiment of the present disclosure.

FIG. 3 is a top view of the flow guiding body 60a in accordance with another embodiment of the present disclosure. This embodiment is similar to which of FIG. 2, and the main difference is that all of the intervals between the protrusion structures 30a are not equal. Specifically, in addition to the first protrusion structure 310, the second protrusion structure 320 and the third protrusion structure 330, the protrusion structure 30a further includes a fourth protrusion structure 340 and a fifth protrusion structure 350. The gap between the third protrusion structure 330 and the fourth protrusion structure 340 is defined as a third interval d3. The gap between the fourth protrusion structure 340 and the fifth protrusion structure 350 is defined as a fourth interval d4. The gap between the fifth protrusion structure 350 and the first protrusion structure 310 is defined as a fifth interval d5. As shown in FIG. 3, the first interval d1, the second interval d2, the third interval d3, the fourth interval d4 and the fifth interval d5 are not equal to each other.

Figure 4:
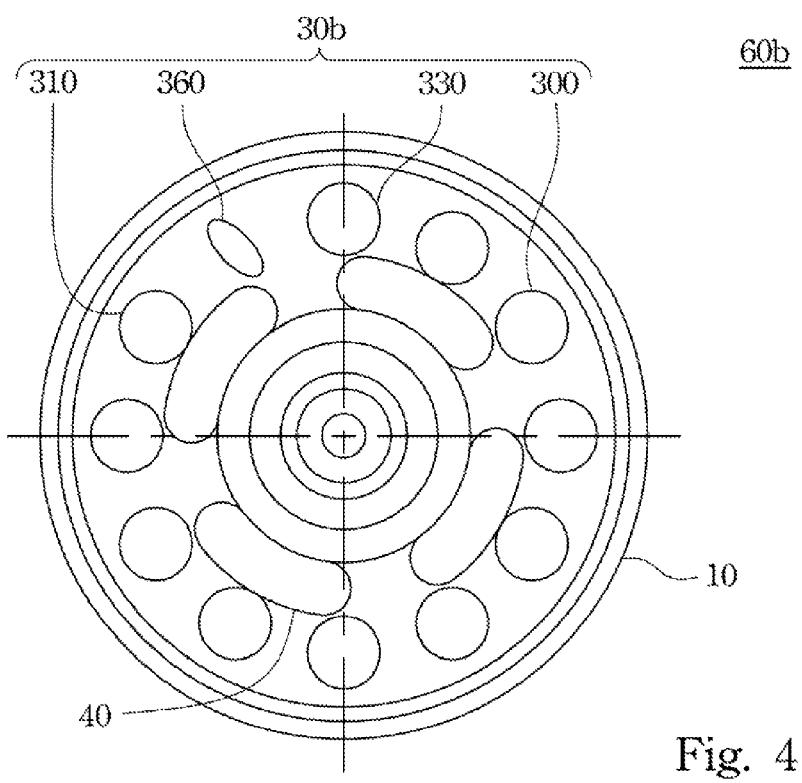
FIG. 4 is a top view of the flow guiding body in accordance with another embodiment of the present disclosure.

FIG. 4 is a top view of the flow guiding body 60b in accordance with another embodiment of the present disclosure. This embodiment is similar to which of FIG. 2, and the main difference is that at least two of the protrusion structures 30b in this embodiment have different shape. Specifically, in FIG. 4, a sixth protrusion structure 360 with the shape different from other protrusion structure 30b replaces the second protrusion structure 320 shown in FIG. 2. In FIG. 4, the first protrusion structure 310, the third protrusion structure 330 and other protrusion structure 300 have similar shape, and only the sixth protrusion structure 360 has the shape different from the first protrusion structure 310, the third protrusion structure 330 and other protrusion structure 300. For example, in top view, the first protrusion structure 310, the third protrusion structure 330 and other protrusion structure 300 have first shape, and the sixth protrusion structure 360 has second shape. The first shape and the second shape are different. In this embodiment, the first shape is circular, and the second shape is elliptical.

Figure 5:
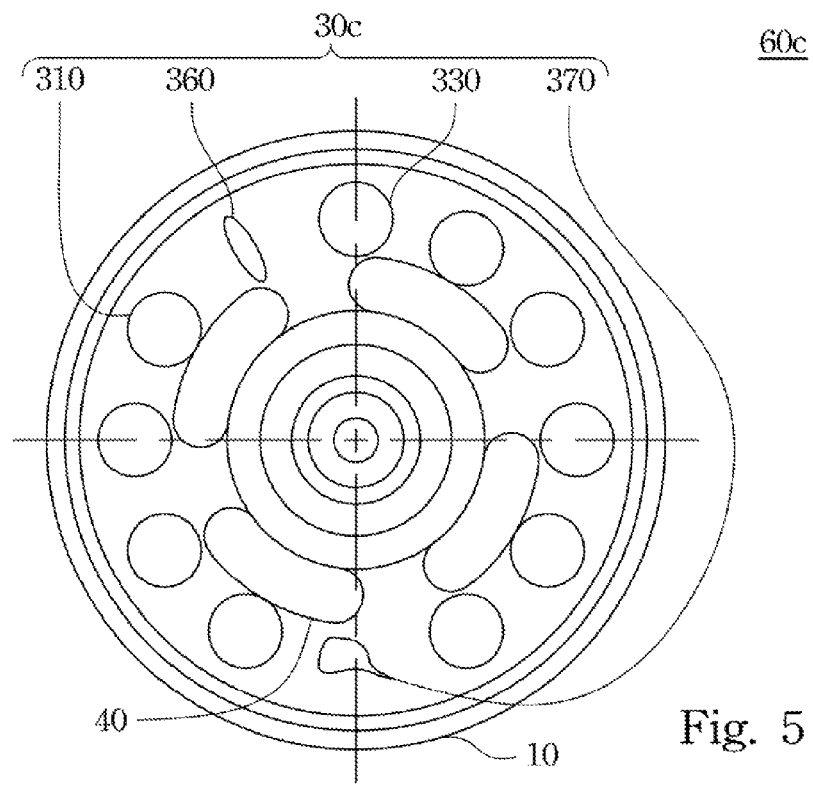
FIG. 5 is a top view of the flow guiding body in accordance with another embodiment of the present disclosure.

FIG. 5 is a top view of the flow guiding body 60c in accordance with another embodiment of the present disclosure. This embodiment is similar to which of FIG. 4, and the main difference is that a seventh protrusion structure 370 is included in this embodiment. The seventh protrusion structure 370 and the third protrusion structure 330 are disposed on opposite sides of the base 10. In some embodiments, the third protrusion structure 330 and the seventh protrusion structure 370 have different shape or height. For example, in top view, the shape of the third protrusion structure 330 can be circular, and the shape of the seventh protrusion structure 370 can be waterdrop-like. In should be understood that the term "waterdrop-like" refers that one side of the structure is an arc and the opposite side is a tip.

Figure 6:
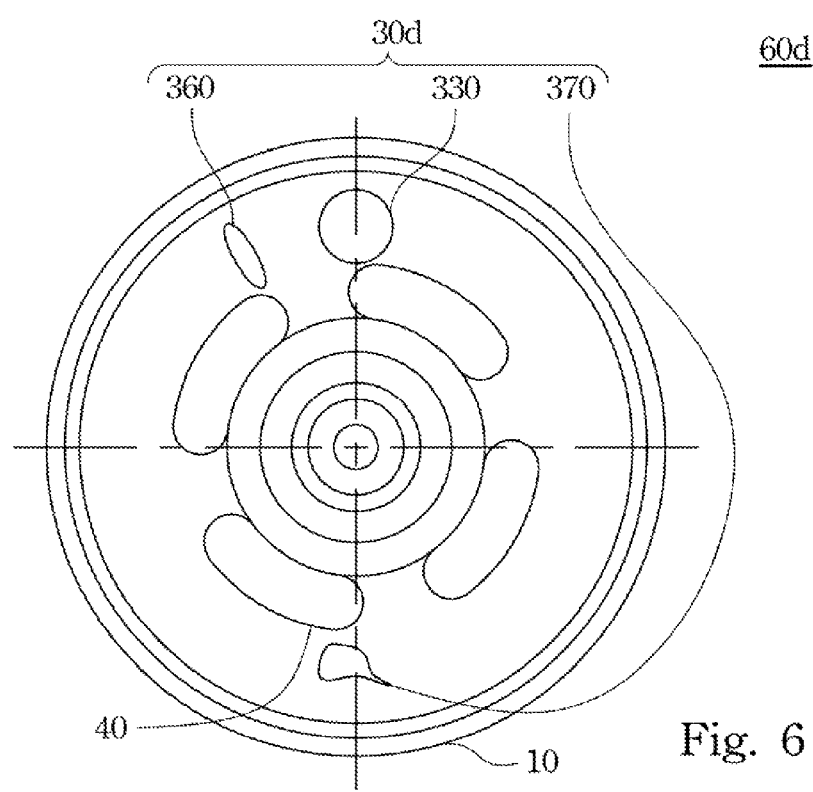
FIG. 6 is a top view of the flow guiding body in accordance with another embodiment of the present disclosure.

FIG. 6 is a top view of the flow guiding body 60d in accordance with another embodiment of the present disclosure. This embodiment is similar to which of FIG. 5, and the main difference is that all of the protrusion structures 30d have different shape. The protrusion structure 30d shown in FIG. 6 includes the sixth protrusion structure 360, the third protrusion structure 330 and the seventh protrusion structure 370. In top view, the shape of the sixth protrusion structure 360 is elliptical, and the shape of the third protrusion structure 330 is circular, and the shape of the seventh protrusion structure 370 is waterdrop-like. The shape of the third protrusion structure 330, the sixth protrusion structure 360 and the seventh protrusion structure 370 is totally different. In some embodiments, the shape of any one of the protrusion structure 30d can be circular, elliptical, waterdrop-like or any combination thereof.

Figure 7:
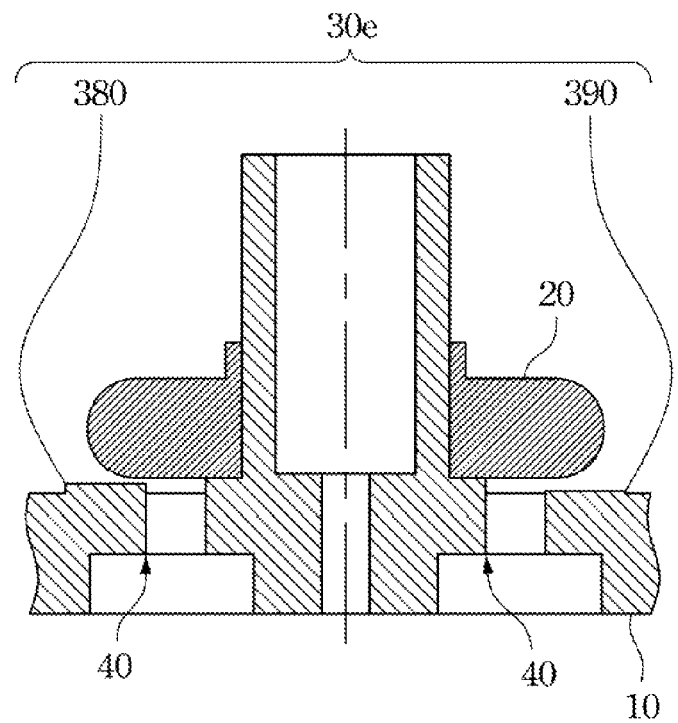
FIG. 7 is a top view of the flow stabilizer in accordance with another embodiment of the present disclosure.

FIG. 7 is a cross-sectional view of the flow stabilizer in accordance with another embodiment of the present disclosure. This embodiment is similar to which of FIG. 1, and the main difference is that at least two protrusion structures 30e have different height in this embodiment. Specifically, the protrusion structure 30e on the base 10 includes an eighth protrusion structure 380 and a ninth protrusion structure 390. The eighth protrusion structure 380 is higher than the ninth protrusion structure 390. In some embodiments, some protrusion structures 30e have different height, and other protrusion structures 30e have the same height. In some embodiments, all of the protrusion structures 30e have different height.

Figure 8:
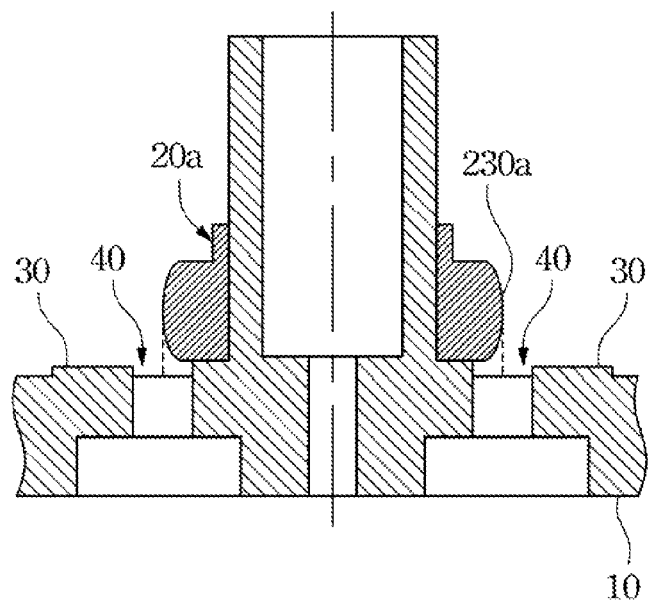
FIG. 8 is a top view of the flow stabilizer in accordance with another embodiment of the present disclosure.

FIG. 8 is a cross-sectional view of the flow stabilizer in accordance with another embodiment of the present disclosure. This embodiment is similar to which of FIG. 1, and the main difference is that a projection of the noise reduction structure 20a projecting to the base 10 covers only part of the flow opening 40 in this embodiment, but in FIG. 1, the projection of the noise structure 20 projecting to the base 10 covers the whole flow opening 40. Specifically, the noise reduction structure 20a includes at least one edge 230a. The projection position of the edge 230a projecting to the base 10 locates in the flow opening 40, as shown in FIG. 8.

In some embodiments, the shape or size of the flow opening, or the interval between the flow opening can be adjusted to modify the turbulent flow passing through the flow opening, so as to obtain the desired flow rate. Various flow openings are set forth in the following.

Figure 9:
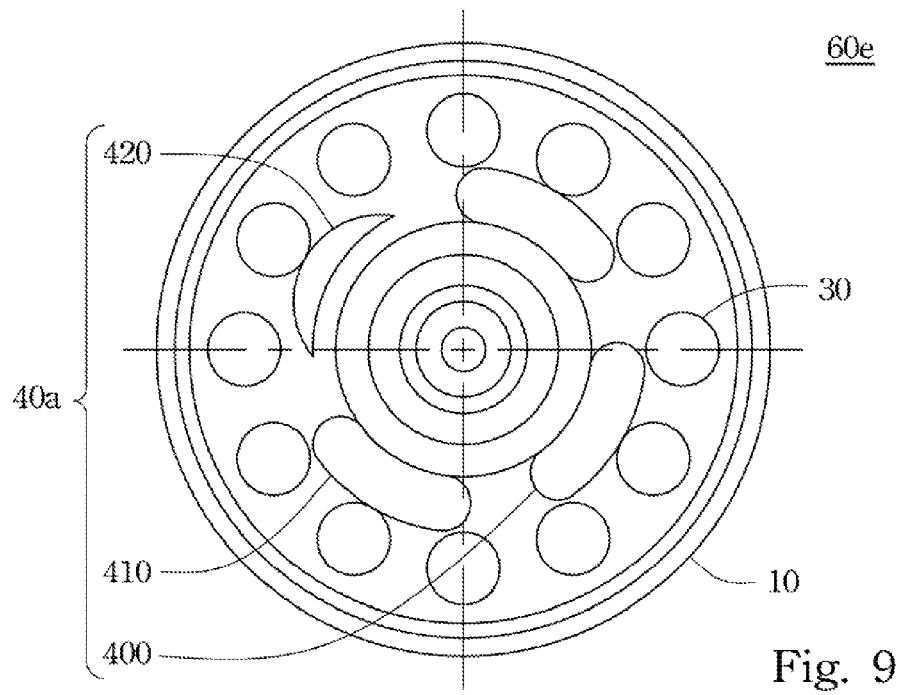
FIG. 9 is a top view of the flow guiding body in accordance with another embodiment of the present disclosure.

FIG. 9 is a top view of the flow guiding body 60e in accordance with another embodiment of the present disclosure. This embodiment is similar to which of FIG. 2, and the main difference is that at leas one of the flow opening 40a has different shape from other flow openings 40a. The flow opening 40a may include a first flow opening 410, a second flow opening 420 and other flow openings 400. The shape of the second flow opening 420 is different from which of the first flow opening 410 and other flow openings 400. For example, in top view, opposite ends of the first flow opening 410 and other flow openings 400 are arc-shaped, but opposite ends of the second flow opening 420 are tip-shaped.

Figure 10:
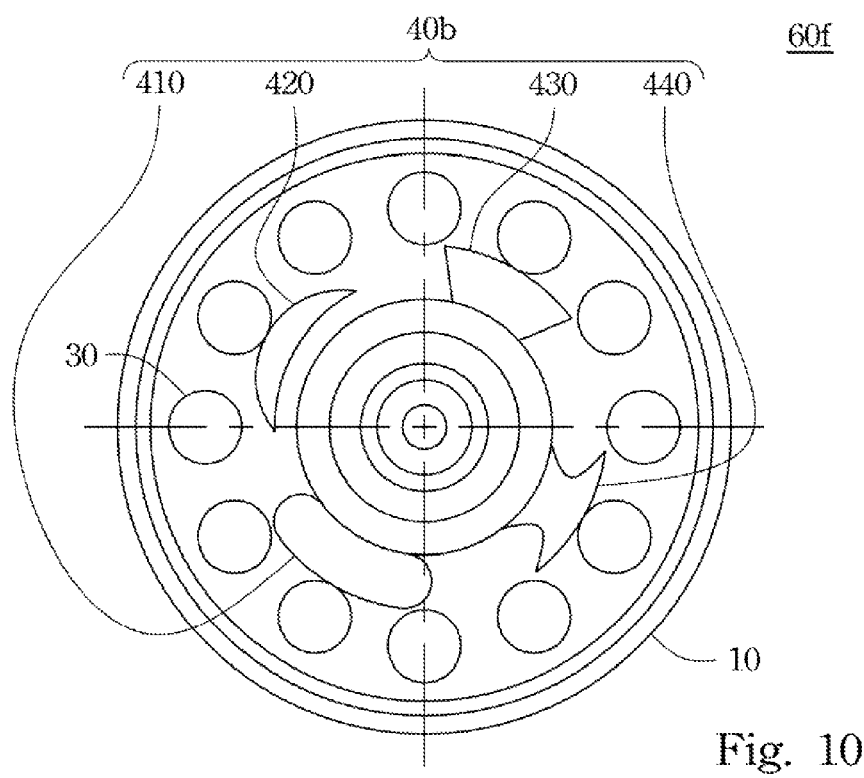
FIG. 10 is a top view of the flow guiding body in accordance with another embodiment of the present disclosure.

FIG. 10 is a top view of the flow guiding body 60f in accordance with another embodiment of the present disclosure. This embodiment is similar to which of FIG. 9 and the main difference is that all of the flow openings 40b have different shape. Specifically, the flow opening 40b includes the first flow opening 410, the second flow opening 420, the third flow opening 430 and the fourth flow opening 440. The shape of the first flow opening 410, the second flow opening 420, the third flow opening 430 and the fourth flow opening 440 is totally different. For example, in top view, the opposite ends of the first flow opening 410 are arc-shaped and the opposite ends of the second flow opening 420 are tip-shaped, and the opposite ends of the third flow opening 430 are slanted lines, and the opposite ends of the fourth opening 440 are concave arcs.

Figure 11:
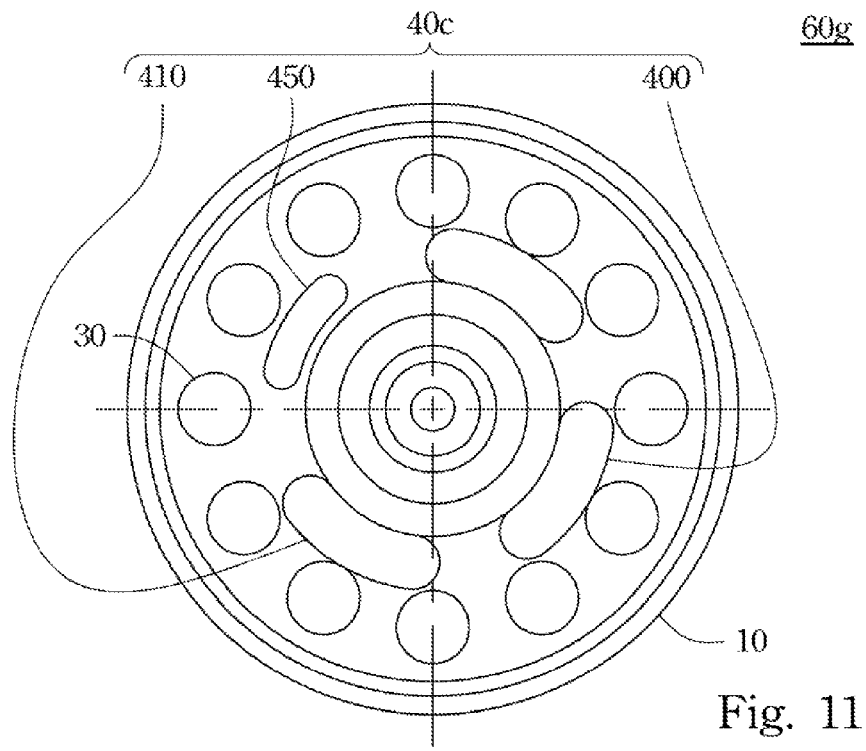
FIG. 11 is a top view of the flow guiding body in accordance with another embodiment of the present disclosure.

FIG. 11 is a top view of the flow guiding body 60g in accordance with another embodiment of the present disclosure. This embodiment is similar to which of FIG. 2, and the main difference is that at least one flow opening 40c as the size different from other flow openings 40c. The flow opening 40c includes the first flow opening 410, the fifth flow opening 450 and other flow openings 400. The shape and size of the first flow opening 410 are the same as which of other flow openings 400. The shape of the fifth flow opening 450 is similar to which of the first flow opening 410, but the size of the fifth flow opening 450 is different from which of the first flow opening 410. Specifically, the size of the fifth flow opening 450 is smaller than which of the first flow opening 410.

Figure 12:
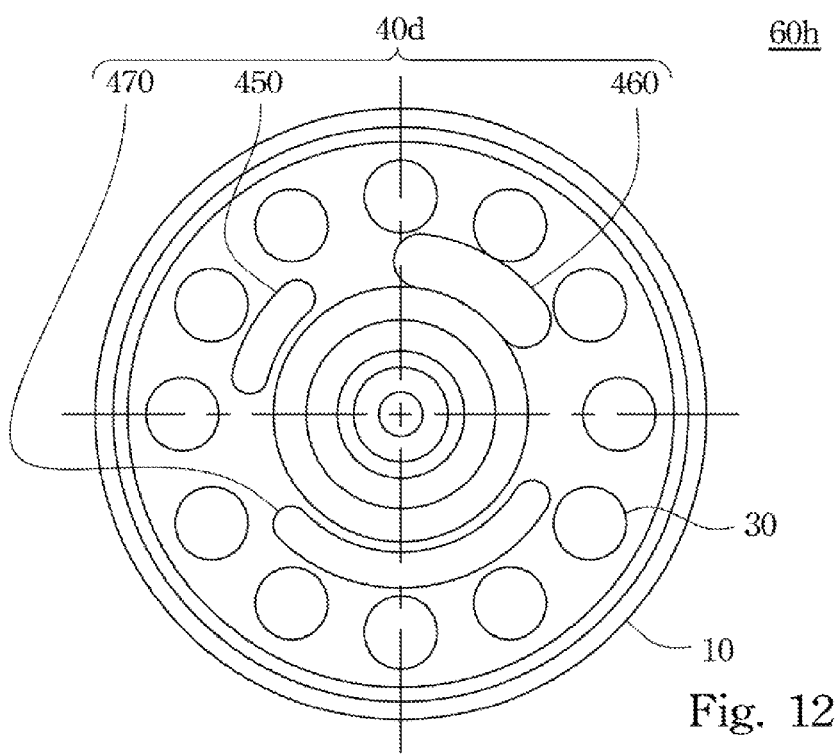
FIG. 12 is a top view of the flow guiding body in accordance with another embodiment of the present disclosure.

FIG. 12 is a top view of the flow guiding body 60h in accordance with another embodiment of the present disclosure. This embodiment is similar to which of FIG. 11, and the main difference is that all of the flow openings 40d have different size. Specifically, the flow opening 40d includes the fifth flow opening 450, a sixth flow opening 460 and a seventh flow opening 470. The fifth flow opening 450, the sixth flow opening 460 and the seventh flow opening 470 have similar shape but different size. Specifically, the size of the fifth flow opening 450 is smaller than which of the sixth flow opening 460 and the size of the sixth opening 460 is smaller than which of the seventh flow opening 470.

Figure 13:
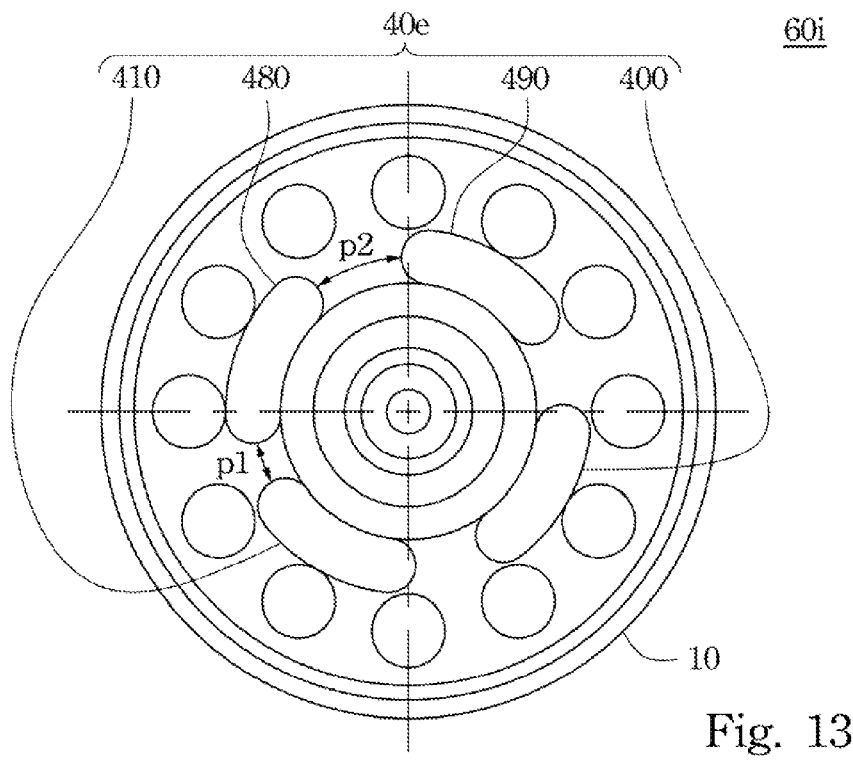
FIG. 13 is a top view of the flow guiding body in accordance with another embodiment of the present disclosure.

FIG. 13 is a top view of the flow guiding body 60i in accordance with another embodiment of the present disclosure. This embodiment is similar to which of FIG. 2, and the main difference is that the flow openings 40e define a plurality of opening intervals, and at least one opening interval is not equal to other opening intervals. Specifically, the flow opening 40e may include the first flow opening 410, an eighth flow opening 480, a ninth flow opening 490 and other flow opening 400. The gap between the first flow opening 410 and the eighth flow opening 480 is defined as a first opening interval p1. The gap between the eighth flow opening 480 and the ninth flow opening 490 is defined as a second opening interval p2. The first opening interval p1 is not equal to the second opening interval p2. For example, the first opening interval p1 can be shorter than the second opening interval p2, while the opening interval between the first flow opening 410 and flow opening 400 and the opening interval between the ninth flow opening 490 and the flow opening 400 can be equal.

Figure 14:
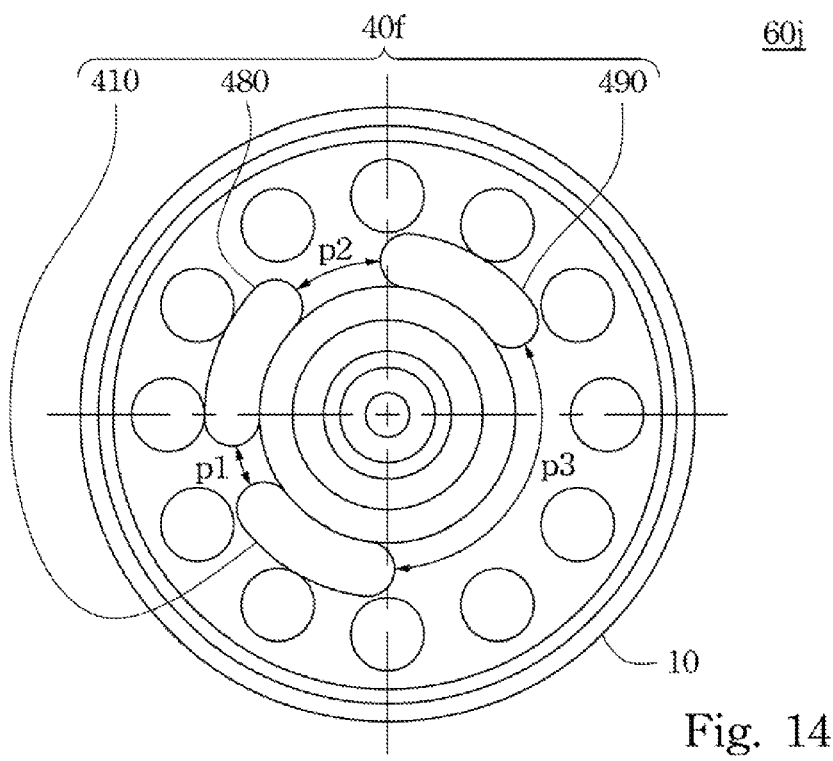
FIG. 14 is a top view of the flow guiding body in accordance with another embodiment of the present disclosure.

FIG. 14 is a top view of the flow guiding body 60j in accordance with another embodiment of the present disclosure. This embodiment is similar to which of FIG. 13, and the main difference is that all opening intervals are not equal to each other. The flow opening 40f includes the first flow opening 410, the eighth flow opening 480 and the ninth flow opening 490. The gap between the first flow opening 410 and the eighth flow opening 480 is defined as the first opening interval p1. The gap between the eighth flow opening 480 and the ninth flow opening 490 is defined as the second opening interval p2. The gap between the first flow opening 410 and the ninth flow opening 490 is defined as a third opening interval p3. The first opening interval p1, the second opening interval p2 and the third opening interval p3 are not equal to each other. For example, the first opening interval p1 is shorter than the second opening interval p2, and the second opening interval p2 is shorter than the third opening interval p3.

In some embodiments, the edge 230 of the noise reduction structure 20 (See FIG. 1) can be formed as various shape, so as to reduce the speed variance of fluid, thereby staling the flow rate and reducing the noise. Various noise reduction structures 20 are set forth in the following.

Figure 15:
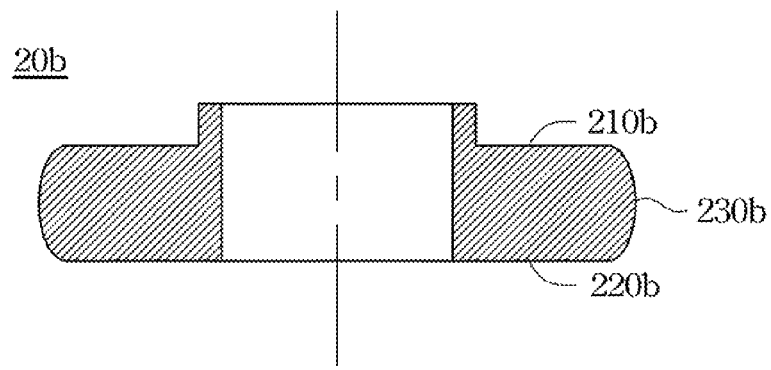
FIG. 15 is a cross-sectional view of the noise reduction structure in accordance with one embodiment of the present disclosure.

FIG. 15 is a cross-sectional view of the noise reduction structure 20b in accordance with one embodiment of the present disclosure. As shown in FIG. 15, the noise reduction structure 20b includes a first surface 210b and a second surface 220b, and an edge 230b formed between the first surface 210b and the second 220b is curved. In some embodiments, the rim connecting the edge 230b and first surface 210b has a first curvature, and the rim connecting the edge 230b and the second surface 220b has a second curvature. The first curvature and the second curvature can be equal or not equal. In other words, the edge 230b can be a surface with non-continuous curvature.

Figure 16:
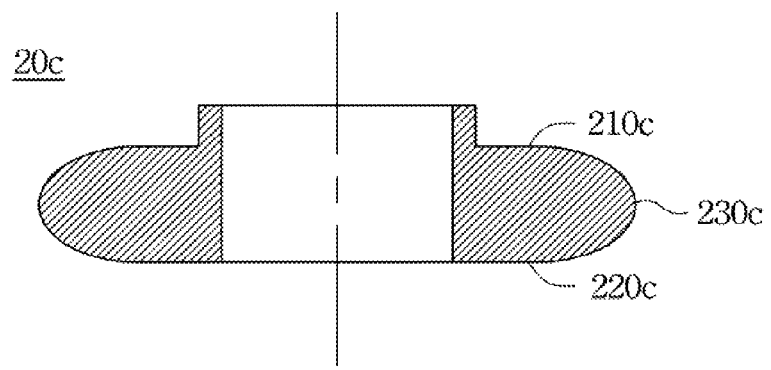
FIG. 16 is a cross-sectional view of the noise reduction structure in accordance with another embodiment of the present disclosure.

FIG. 16 is a cross-sectional view of the noise reduction structure 20c in accordance with another embodiment of the present disclosure. This embodiment is similar to FIG. 15, and the main difference is that the edge 230c formed between the first surface 210c and the second surface 220c is shaper than the edge 230b shown in FIG. 15.

Figure 17:
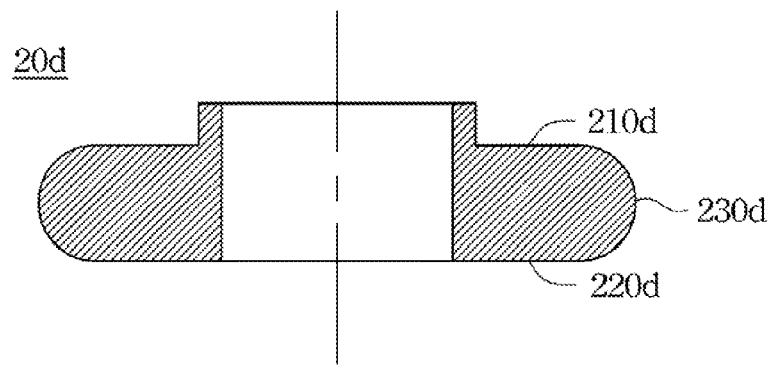
FIG. 17 is a cross-sectional view of the noise reduction structure in accordance with another embodiment of the present disclosure.

FIG. 17 is a cross-sectional view of the noise reduction structure 20d in accordance with another embodiment of the present disclosure. This embodiment is similar to FIG. 15, and the main difference is that the edge 230d formed between the first surface 210d and the second surface 220d is a round surface. In other words, the edge 230d is the surface with continuous curvature.

Referring back to FIG. 1, in aforementioned embodiments, a narrow hole 50 is formed on the base 10 for maintaining the flow rate and reducing the noise raised by flowing fluid. The shape of the narrow hole 50 includes, but is not limited to include, circle, ellipse, etc. In some embodiments, the narrow hole 50 can also be formed on the noise reduction structure 20. Further, in some embodiments, no narrow hole 50 is formed on either the base 10 or the noise reduction structure 20.

Figure 18:
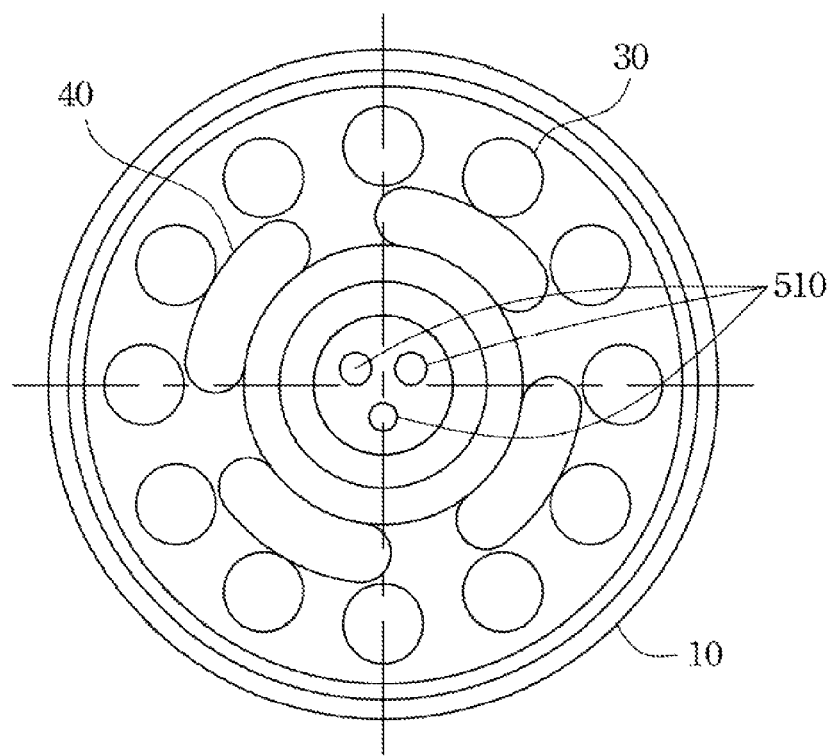
FIG. 18 is a top view of the flow guiding body in accordance with another embodiment of the present disclosure.

FIG. 18 is a top view of the flow guiding body 60k in accordance with another embodiment of the present disclosure. This embodiment is similar to FIG. 2, and the main difference is that a plurality of narrow holes 510 are included in this embodiment, and these narrow holes 510 are arranged equidistantly.

Referring back to FIG. 1, in some embodiments, a pillar 110 is formed on the base 10. The noise reduction structure 20 can be put on the pillar 110, so as to prevent the noise reduction structure 20 from moving when the fluid flows toward the flow stabilizer, thereby stabilizing the noise reduction structure 20.

In aforementioned embodiments, the noise reduction structure 20 is preferably formed by elastic material so as to deform corresponding to the fluid pressure. The elastic material may include, but is not limited to include, rubber, EPDM rubber (ethylene propylene diene monomer rubber), Silicone®, and so on.

Under the same condition, when a water solenoid valve includes the flow stabilizer disclosed above, the flow rate variance of the water solenoid valve can be controlled lower than 5%, and the noise raised by the flowing fluid can be reduced. When the fluid pressure born by the water solenoid valve is 0.3 and 10 bar respectively, the variance between the flow rate under 0.3 bar and the flow rate under 10 bar is only 2%. Therefore, it is clear that even if the pressure varies severely, the flow stabilizer can still stable the flow rate and reduce the noise.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A flow stabilizer, comprising:
   a base;
   a noise reduction structure disposed on the base;
   a plurality of protrusion structures disposed between the base and the noise reduction structure, the protrusion structures defining a plurality of intervals, wherein at least two of the intervals are not equal; and
   a pillar disposed on the base, wherein the pillar has a passageway extending unobstructed through a central axis of the pillar;
   wherein the base is formed with a hole extending unobstructed through a central axis of the base, the central axis of the base being substantially coincident with the central axis of the pillar;
   wherein a width of the passageway of the pillar along a direction substantially perpendicular to the central axes of the pillar and the base is larger than a width of the hole of the base along a direction substantially perpendicular to the central axes of the pillar and the base;
   wherein the noise reduction structure is formed of a deformable elastic material, and is disposed immovably but deformably around the pillar.

2. The flow stabilizer of claim 1, wherein the protrusion structures are disposed on opposite sides of the base.

3. The flow stabilizer of claim 1, further comprising:
   at least one flow opening formed on the base, and a projection of the noise reduction structure projecting to the base covers at least part of the flow opening.

4. The flow stabilizer of claim 3, wherein the number of the flow opening is plural, and at least two of the flow openings have different shape or size.

5. The flow stabilizer of claim 3, wherein the number of the flow opening is plural, and the flow openings define a plurality of opening intervals, wherein at least two of the opening intervals are not equal.

6. The flow stabilizer of claim 1, wherein the intervals are different.

7. The flow stabilizer of claim 6, further comprising:
   at least one flow opening formed on the base, and a projection of the noise reduction structure projecting to the base covers at least part of the flow opening.

8. The flow stabilizer of claim 7, wherein the number of the flow opening is plural, and at least two of the flow openings have different shape or size.

9. The flow stabilizer of claim 7, wherein the number of the flow opening is plural, and the flow openings define a plurality of opening intervals, wherein at least two of the opening intervals are not equal.

10. A flow stabilizer, comprising:
    a base;
    a noise reduction structure disposed on the base;
    a plurality of protrusion structures disposed between the base and the noise reduction structure, wherein at least two of the protrusion structures having different shape or height; and
    a pillar disposed on the base, wherein the pillar has a passageway extending unobstructed through a central axis of the pillar;
    wherein the base is formed with a hole extending unobstructed through a central axis of the base, the central axis of the base being substantially coincident with the central axis of the pillar;
    wherein a width of the passageway of the pillar along a direction substantially perpendicular to the central axes of the pillar and the base is larger than a width of the hole of the base along a direction substantially perpendicular to the central axes of the pillar and the base;
    wherein the noise reduction structure is formed of a deformable elastic material, and is disposed immovably but deformably around the pillar.

11. The flow stabilizer of claim 10, wherein the protrusion structures are disposed on opposite sides of the base.

12. The flow stabilizer of claim 10, further comprising:
    at least one flow opening formed on the base, and a projection of the noise reduction structure projecting to the base covers at least part of the flow opening.

13. The flow stabilizer of claim 12, wherein the number of the flow opening is plural, and at least two of the flow openings have different shape or size.

14. The flow stabilizer of claim 12, wherein the number of the flow opening is plural, and the flow openings define a plurality of opening intervals, wherein at least two of the opening intervals are not equal.

15. The flow stabilizer of claim 14, wherein the opening intervals are different.

\* \* \* \* \*